United States Patent Office 3,301,373
Patented Jan. 31, 1967

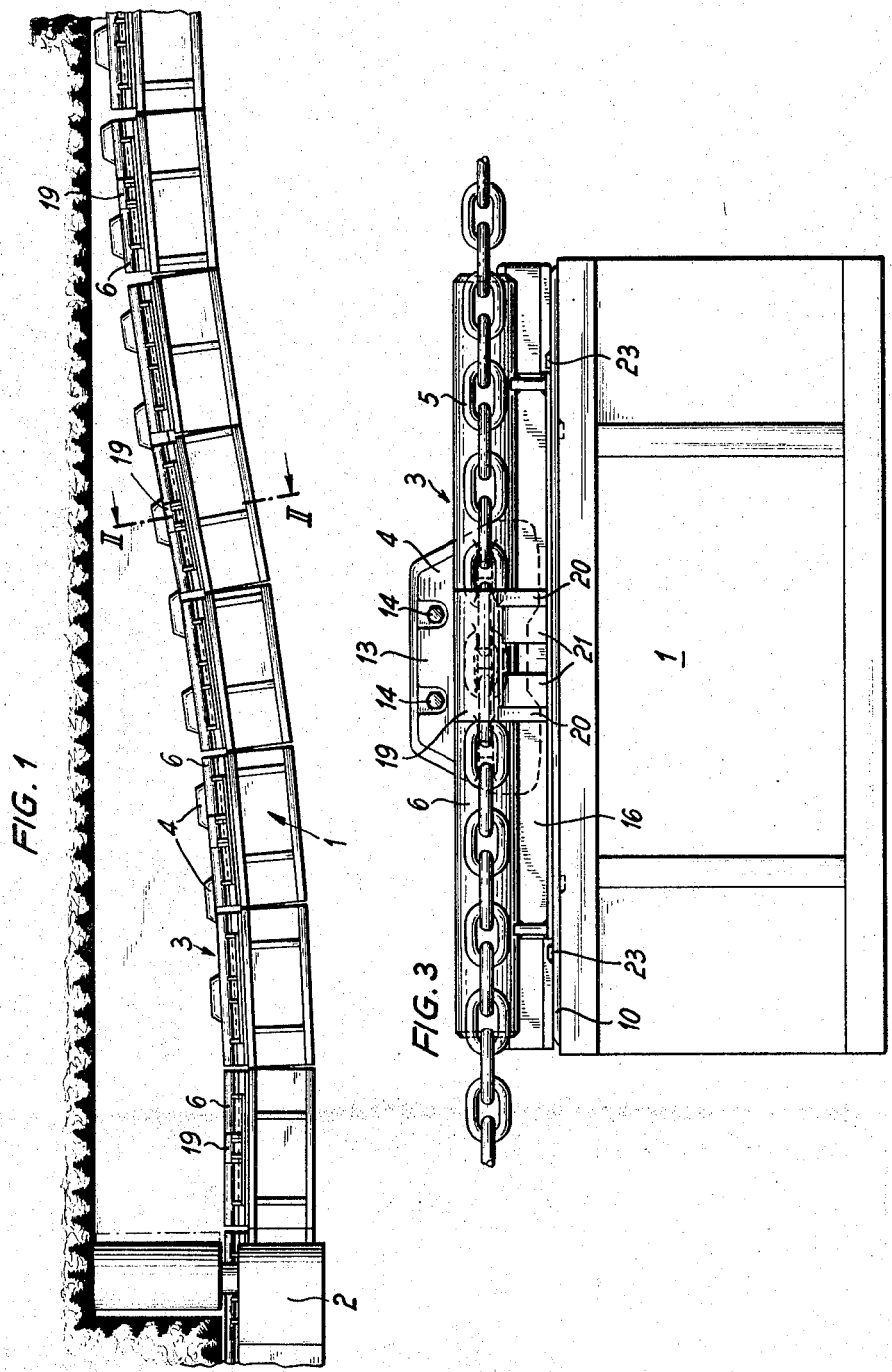

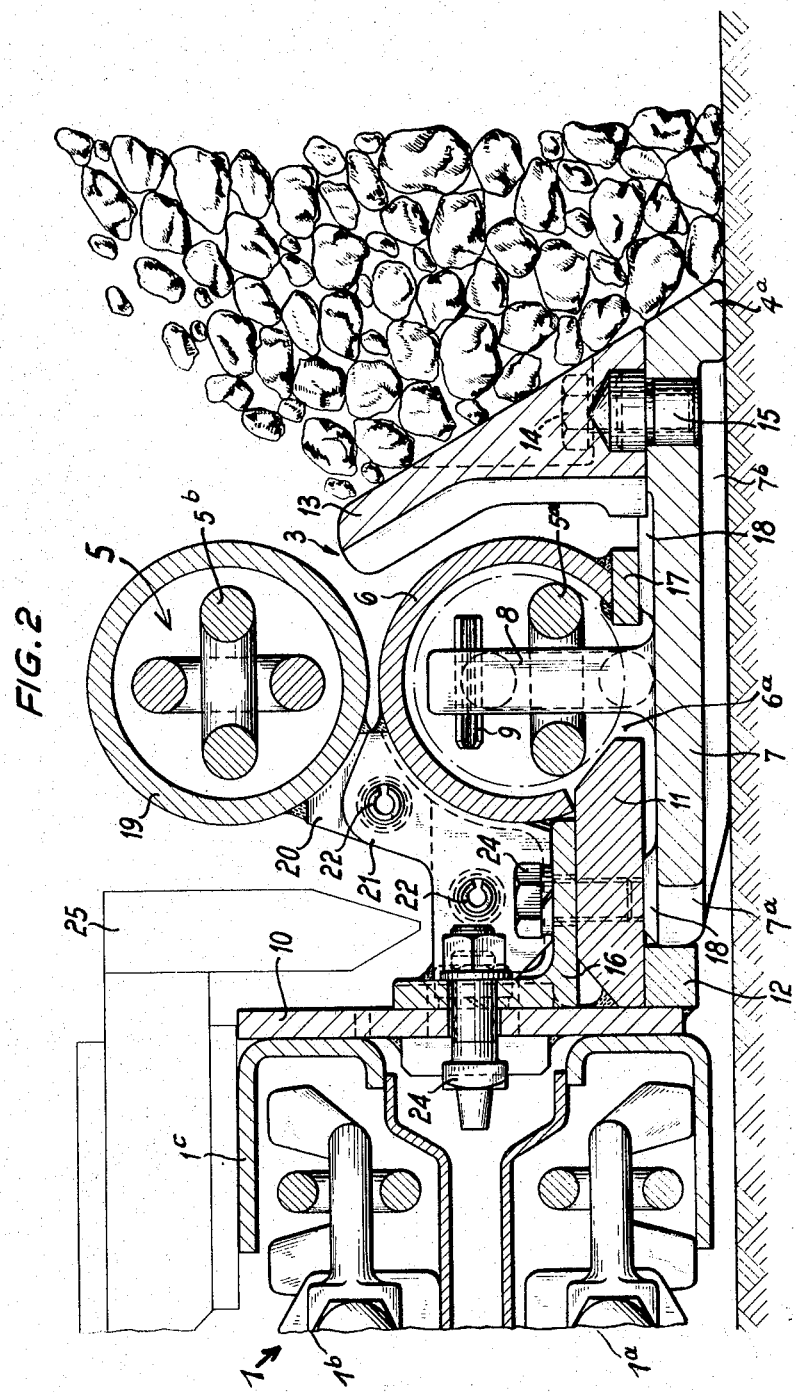

3,301,373
COAL REMOVING MACHINE
Oskar Willner and Reimund Karkutt, Bochum, Germany, assignors to Gebr. Eickhoff, Maschinenfabrik und Eisengiesserei m.b.H., Bochum, Germany
Filed Dec. 14, 1964, Ser. No. 418,141
7 Claims. (Cl. 198—10)

The present invention relates to a coal removing machine following a coal digging machine, for instance a coal cutter, and being adapted to remove the coal cut by a coal cutting machine to a conveyor extending along the wall of a coal face. Such a conveyor may, for instance be a trough conveyor or scraper conveyor. The said coal removing machine is composed of a plurality of units connected to a strand of an endless pulling means, for instance a chain, which is parallel to the conveying means and moves back and forth. Each of said units of said coal removing machine furthermore comprises a foot plate movable on the floor of the seam and having rigidly connected thereto a removing shoe which extends at an angle with regard to said conveying means.

Mounted on the other side of said conveying means is an advancing or pushing device which follows the coal digging machine at a certain distance and comprises, for instance so-called pushing cylinders. This pushing device pushes the individual units of the coal removing machine during the reciprocatory movement thereof by means of the foot plates and by means of the removing shoe into the coal pile between the coal face and the conveying means. The removing shoe pick up the coal and pass the same to the conveying means.

It is an object of the present invention to provide an arrangement of the general character set forth above, which will make it possible to operate with a minimum of pulling force for the reciprocatory movement of the units of the coal removing machine.

It is another object of this invention to provide an arrangement as set forth above, in which the power requirement for the pushing device is considerably reduced and in which the units of the removing machine will, when entering the coal pile, substantially remain on the floor of the seam and will not carry out any climbing movements.

Still another object of this invention consists in so to support the coal removing machine on the framework of the conveying means that the pulling means required for pulling the units back and forth will be relieved from pressure forces exerted by the pushing device.

It is also an object of this invention so to guide the coal removing device that a very narrow space for said coal removing machine will suffice thereby permitting arrangement of the conveying means as close as possible to the new coal face.

Still another object of this invention consists in so to protect the endless pulling means for the coal removing units that a soiling of said pulling means by the loosened coal will be prevented to a large extent.

These and other objects and advantages of the invention will appear more clearly from the following specification in connection with the accompanying drawings, in which:

FIGURE 1 is a top view of an arrangement according to the present invention diagrammatically illustrating a coal digging machine during its operation, and the coal removing machine with the conveyor means pertaining thereto;

FIGURE 2 is a cross-section through the conveying means and a coal removing unit, said section being taken along the line II—II of FIGURE 1 but being illustrated on a larger scale than that of FIGURE 1; and FIGURE 3 is a top view of the conveying means and parts of the coal removing machine.

The present invention is characterized primarily in that the foot plates of the coal removing machine are located at a lower level than the bottom surface of the conveying means and are guided on the side wall of the conveying means at that side which faces away from the coal removing shoes of the coal removing machine. In this way, the forces of the pushing device are effected in a plane which facilitates the penetration of the coal removing units into the coal pile.

When a link chain is employed as pulling means for the units of the coal removing machine, the return strand of the chain is guided above the pulling chain or pulling strand. This results in a particularly narrow construction. The foot plate is provided with noses extending through a lower slot of a guiding tube for the pulling chain and enter a horizontal link of the chain.

Referring now to the drawing in detail, the arrangement shown therein comprises conveying means 1 which in the particular example shown represents a so-called double-edge conveyor in which the return strand 1a (FIG. 2) is located below the conveying strand 1b and is guided in a framework composed of sheet metal members. The coal digging machine 2 shown diagrammatically only in FIG. 1, is in the particular example illustrated, represented by a roller cutter. Coal digging machine 2 cuts the coal at a wide front and thus forms the new coal face, as shown in FIG. 1. The coal cut by the coal cutting machine drops into the space therebehind, and it is the purpose of the coal removing machine 3 to load the thus dug coal into the conveying means 1.

The coal removing machine 3 comprises a number of independent units 4 arranged one behind the other in spaced relationship to each other in the longitudinal direction of the long wall of the coal face. These units are connected to a round link chain 5 and pulled back and forth parallel to the conveying means by means of chain 5.

As will be seen from FIG. 1, the conveying means 1, is behind the coal cutting machine 2, shifted toward the new coal face. The movement of the conveying means 1 toward the new coal face is effected by means of a pushing device which is located on that side of conveying means 1 which faces away from the coal face. Such pushing device may be of any standard design for instance of the type describe in U.S. Patent No. 3,113,763.

The pushing device pushes the conveying means 1 and consequently the coal removing device connected thereto toward the coal face and into the dug coal. This pushing device thus represents the power source for the loading work to be performed by the coal removing machine.

As mentioned above, the coal removing machine carries out a reciprocatory movement which facilitates the entrance into the cut coal and the loading thereof. The pulling strand 5b of the round link chain 5 is located in tube means 6. The individual units of the coal removing machine each comprise an inclined removing shoe 13 and a foot plate 7. Shoe 13 and foot plate 7 are detachably interconnected by screws 14. In order to relieve screws 14 from the high forces occurring during the pushing operation by the pushing device, shoe 13 and foot plate 7 are additionally interconnected by fitting bolts 15. The top side of each foot plate 7 is provided with a nose 8 extending through a continuous lower slot 6a in pipe means 6 and entering a horizontal link of the round link chain 5. To secure link chain 5 on noses 8 of the foot plates, each nose is provided with a cotter-pin 9 extending therethrough.

To that side of frame 1c for conveying means 1 which faces the coal face there is connected, for instance by bolts or by welding, a vertical plate 10. The length of plate 10 is in conformity with the respective adjacent section of the trough conveyor. Plate 10 has connected thereto a rectangular ledge or strip 11 which overlaps foot plate 7. Beneath ledge 11 there is a ledge 12 of square cross-section which serves as guiding member proper for the foot plate 7. Foot plate 7 is equipped with protruding studs 7a which extend laterally toward the conveyor and by means of which foot plate 7 rests against a guiding strip 12. The forces exerted by the pushing device thus act through the frame 1c of the conveying means 1, plate 10, and guiding ledge 12 upon the said protruding studs 7a of foot plate 7 and thereby upon removing shoes 13. The reciprocatory movement of the removing shoes aids in the penetration of the removing shoes into the pile of cut coal.

An angle iron 16 is welded to that longitudinal edge of tubular means 6 which faces conveying means 1. Angle iron 16 is connected to plate 10 and ledge 11 by screws 24. The other side of tubular means 6 has tightly welded thereto a flat iron 17 for guiding foot plate 7 as to height.

As will be evident from the drawings, skids 7b connected to the bottom surface of foot plate 7 are located at a level lower than the bottom surface of frame 1c for conveying means 1. This is a very important feature of the invention inasmuch as in this way frame 1c of conveying means 1 is somewhat raised at that side which faces the coal face, and therefore lower frictional forces will here occur when the conveying means is pushed toward the coal face. Furthermore, due to the fact that the front tip 4a of units 4 is located at a lower level (FIG. 2), a downwardly directed component of the pushing force will counteract a climbing tendency of the coal removing machine and will assure that the tip of the coal removing shoes 3 will remain at the floor of the seam, thereby assuring that the coal will be picked up completely. The guiding of foot plates 7 as to height is furthermore aided by extensions 18 arranged on the top side of the foot plates 7 and engaging on one hand the bottom side of iron 17, and on the other hand the bottom side of ledge 11. Bosses 23 (FIG. 3) engage angle 16 and relieve the connecting screws 24 of angle 16 from longitudinal forces caused by the chain pull.

The free return strand 5b of chain 5 passes above the tubular means 6. By means of short guiding members 19 the ends of which may flare outwardly, chain strand 5b is guided at spaced sections. Guiding members 19 are supported by lateral extensions 20 which engage the space between the legs of angle iron 16 and tubular means 6, and are in conformity with the shape of said space. In the said space there are provided ribs 21 which laterally enclose the extensions 20 and receive the ends of clamping pins 22 arranged in extensions 20 and holding said extensions.

The provision of guiding members 19 and the arrangement of the return strand above the pulling chain is of importance in two respects. First, the guiding of the coal removing machine becomes relatively small. Secondly, that space which is located on that wall of conveying means 1 which faces the coal face will, between conveying means 1 and guiding members 19, remain free for the passage of the machine carriage 25 indicated in FIG. 2 in dot-dash lines.

It is, of course, to be understood that the present invention is, by no means, limited to the particular arrangement shown in the drawings, but also comprises any modifications within the scope of the appended claims.

What we claim is:

1. In an arrangement for removing cut coal: reciprocating pulling means adapted to be arranged in the longitudinal direction of a coal face, a plurality of units of coal removing means connected to said pulling means for reciprocatory movement and spaced from each other in the longitudinal direction of said pulling means, conveyor means movable transversely toward the coal face and connected to said coal removing means for moving said coal removing means toward said coal face and for receiving and conveying coal picked up by said coal removing means, each of said units of said coal removing means including foot plate means and coal removing inclined shoe means rigidly connected to said foot plate means and inclined upwardly and rearwardly toward said conveyor means, the bottom surface of said foot plate means normally being lower than the bottom surface of said conveyor means, and guiding means connected to said conveyor means and in guiding arrangement with said foot plate means for guiding the same.

2. An arrangement according to claim 1, in which said pulling means is laterally flexible and endless and is substantially parallel to said conveyor means.

3. In an arrangement for removing cut coal: reciprocating pulling means adapted to be arranged in the longitudinal direction of a coal face, a plurality of units of coal removing means connected to said pulling means for reciprocating movement and spaced from each other in the longitudinal direction of said pulling means, and conveyor means movable transversely toward the coal face and connected to said coal removing means for moving said coal removing means toward said coal face and for receiving and conveying coal picked up by said coal removing means, each of said units of said coal removing means including foot plate means and coal removing inclined shoe means rigidly connected to said foot plate means and inclined upwardly and rearwardly toward said conveyor means, the bottom surface of said foot plate means normally being lower than the bottom surface of said conveyor means, said conveying means including frame means facing said pulling means and also including guiding rail means connected to said frame means and engaging said foot plate means for guiding the same.

4. In an arrangement for removing cut coal: reciprocating pulling means formed by an endless link chain and having a first section and a second section arranged above said first section, said pulling means being adapted to be arranged in the longitudinal direction of a coal face, a plurality of units of coal removing means connected to said pulling means for reciprocating movement and spaced from each other in the longitudinal direction of said pulling means, conveyor means movable transversely toward the coal face and connected to said coal removing means for moving said coal removing means toward said coal face and for receiving and conveying coal picked up by said coal removing means, each of said units of said coal removing means including foot plate means and also including coal removing inclined shoe means rigidly connected to said foot plate means and inclined upwardly and rearwardly toward said conveyor means, said first section being movably connected to said foot plate means, the bottom surface of said foot plate means normally being lower than the bottom surface of said conveyor means, and guiding means connected to said conveyor means and in guiding engagement with the adjacent side of and a top surface of said foot plate means for guiding the same.

5. In an arrangement for removing cut coal: reciprocable link chain means adapted to be arranged in the longitudinal direction of a coal face and having a first section and a second section arranged above said first section, first tubular means housing said first section and having its bottom portion provided with slot means extending throughout the length of said first tubular means, second tubular means housing said second section, a plurality of units of coal removing means spaced from each other in the longitudinal direction of said link chain means, conveyor means movable transversely toward the coal face and connected to said coal removing means for moving said coal removing means toward said coal face and for receiving and conveying coal picked up by said coal removing means, each of said units of said coal removing means including a foot plate and a coal removing inclined shoe rigidly connected to said foot plate and inclined upwardly and rearwardly toward said conveyor means, each of said units of said coal removing means also including means connected to said foot plate and extending through said slot means into operative engagement with the respective first section of said link chain means, and guiding means connected to said conveyor means in guiding arrangement with the foot plates of said coal removing means for guiding the same.

6. An arrangement according to claim 5, in which said first and second tubular means are composed of spaced tubular sections.

7. An arrangement according to claim 1, in which said foot plate means and said removing shoe means are connected to each other by fitting bolt means.

References Cited by the Examiner

UNITED STATES PATENTS

| 1,536,535 | 5/1925 | Smith | 198—10 |
| 1,773,414 | 8/1930 | Warden | 198—7 |
| 2,925,899 | 2/1960 | Coffman | 198—7 |

FOREIGN PATENTS

| 1,319,993 | 1/1963 | France. |

SAMUEL F. COLEMAN, *Primary Examiner.*

EVON C. BLUNK, *Examiner.*

R. E. KRISHER, A. C. HODGSON,
*Assistant Examiners.*